United States Patent Office 3,129,212
Patented Apr. 14, 1964

3,129,212
POLYMERIZATION OF ETHYLENE IN THE PRESENCE OF A FREE RADICAL INITIATOR, A CHEMICAL MODIFIER, AND METHANE AS A PHYSICAL MODIFIER
George A. Mortimer, La Marque, Tex., assignor to Monsanto Chemical Company, St. Louis, Mo., a corporation of Delaware
No Drawing. Filed Dec. 30, 1960, Ser. No. 79,518
12 Claims. (Cl. 260—94.9)

This invention relates to the polymerization of ethylene at high pressures. More particularly, it is concerned with the production of normally solid polymers by the catalytic polymerization of ethylene in the presence of methane.

Various proposals have been made for polymerizing ethylene, the prime objective of which has been the production of high molecular weight polymers of high tensile strength. It is known that solid polymers of ethylene can be produced by employing elevated pressures such as from 1000 to 2000 atmospheres and elevated temperatures such as from 100 to 400° C. Various catalysts can be used to initiate the polymerization reaction depending on the product properties desired. Oxygen, numerous peroxides, and azo compounds are commonly used as initiators. To produce a polymer of certain specific properties of density, molecular weight, melt viscosity, tensile strength, stiffness, and appearance, minor amounts of compounds known as modifiers are added to the feed. For most applications, the polymer properties desired are high density and narrow molecular weight distribution. These are attained by the use of chemical modifiers at lower pressures than otherwise could be used to obtain them. Some modifiers which are well known for their various effects on the product are propane, xylene, cyclohexane, acetone, propylene, carbontetrachloride, chloroform and ethane. Nearly all of these have been disclosed or claimed in various U.S. patents for their unique and beneficial effects on the polymer.

However, for some applications it is desirable to have a broad molecular weight distribution. When operating at higher pressures to benefit from higher density product and greater reaction conversions, it is virtually impossible to maintain a broad molecular weight distribution. The change in molecular weight distribution is believed to be due to increased solubility of the polymer in the monomer at higher pressures.

This tends to destroy the desired state of heterogeneity in the reaction which is responsible for broad molecular weight distribution in the polymer product. When certain chemical modifiers are employed in the polymerization, the tendency toward homogeneity is even more pronounced since it is known that the solubility of polyethylene in ethylene is increased as the critical point of the gas mixture increases. Thus, if the desired heterogeneity is to be maintained at high pressures or when chemical modifiers are employed, the solubility of polyethylene in ethylene must be decreased by raising the critical solution pressure.

It has now been discovered that this can be done by introducing methane into the system. The addition of this saturated hydrocarbon with a lower critical point than that of ethylene will physically modify and raise the critical solution pressure by lowering the critical point of the gas mixture thus promoting the desired degree of heterogeneity, and consequently broader molecular weight distribution, heretofore unattainable at higher pressures.

The difference between chemical modifiers and physical modifiers is not defined in the prior art. A chemical modifier is a substance that reacts with the polymerizing ethylene and forms a part of the polymer molecule. Propane or propylene are examples of this. However, a physical modifier is a substance which changes the physical state of the reaction but does not enter into the polymerization so as to become a part of the polymer molecule. One rough rule of thumb that can be used to distinguish between the two types of modifiers is the fact that a physical modifier usually does not change the number average molecular weight of the polymer whereas a chemical modifier usually, but not always, does change the molecular weight.

Besides the advantage of maintaining a broad molecular weight distribution at higher pressures, there is another advantage from the addition of a physical modifier. When high concentrations of a chemical modifier are employed, especially at the lower temperatures where a high degree of chain transfer activity is necessary to control molecular weight, it has been found that the rate of polymerization is usually reduced. However, the addition of a physical modifier to induce or approach heterogeneity restores the polymerization rate. This result depends on the partitioning of the modifier between the two phases. The number average molecular weight is essentially the same whether the physical modifier is present or not.

It is, therefore, the object of this invention to provide a high pressure ethylene polymerization process which will produce at high pressures a polymer product having broad molecular weight distributions as well as higher density. It is a further object of this invention to provide a process for ethylene polymerization whereby the polymerization rate is maintained at a high level while carrying out the reaction in the presence of high concentrations of chemical modifiers at low temperatures. These and other objects of the invention will become apparent from the following description.

According to the present invention ethylene is polymerized at high pressures and temperatures in the presence of a free-radical initiator, a chemical modifier, and methane as a physical modifier.

The following examples are given to illustrate the invention, but they are not introduced with the intention of unduly limiting the generally broad scope of the invention.

*Example I*

A steel pressure bomb, after careful purging of the bomb and all lines connected thereto to eliminate all traces of air, was filled with ethylene and 6 cc. of acetone as a chemical modifier. Hot ethylene was pumped into the bomb until the pressure reached 7500 p.s.i. and 130° C. The mechanical agitator inside the bomb was started and 11.8 parts per million of di-tertiary-butyl peroxide was added as an initiator. The bomb was then pressured by means of an ethylene pump to the final conditions of 20,000 p.s.i. and 130° C. The acetone was calculated as 1.93 weight percent of the total contents of the bomb. The rate of polymerization at the final conditions was determined to be 7.5 weight percent of polyethylene per hour.

*Example II*

Ethylene was polymerized in the steel bomb under the identical conditions as in Example I except that 10 cc. of acetone as a modifier was added to the bomb. This amounted to 3.21 weight percent of the total contents of the bomb at final conditions. The rate of polymerization at the final conditions was determined to be 3.5 weight percent per hour.

*Example III*

Ethylene was polymerized in the steel bomb under the identical conditions as in Example I except that 0.335 mole of methane was added to the bomb at 400 p.s.i. and 26° C. The amount of acetone was the same as in Example II and was determined to be 3.21 weight percent of the contents of the bomb at the final conditions. The methane was determined to be 7.85 weight percent of the total contents of the bomb. The rate of polymerization was measured at 7.0 weight percent per hour.

*Example IV*

Ethylene is polymerized in the steel bomb of Example I at 20,000 p.s.i. and 220° C. in the presence of approximately 8% methane and acetoxime as a catalyst. In successive runs about 4% by weight of propane, propylene, heptane, octadecene, and butene-1, respectively, are used as chemical modifiers. The rate of polymerization is comparable to that obtained in Example III demonstrating that methane functions to offset the decrease in polymerization rate which usually occurs when high concentrations of a chemical modifier are used.

*Example V*

Ethylene is polymerized in the steel bomb of Example I at 20,000 p.s.i. and 150° C. in the presence of approximately 8% methane and oxygen as a catalyst. In successive runs about 4% by weight of xylene, cumene, and toluene respectively, are used as chemical modifiers. The rate of polymerization is comparable to that obtained in Example III demonstrating that methane functions to offset the decrease in polymerization rate which usually occurs when high concentrations of a chemical modifier are used.

*Example VI*

Ethylene is polymerized in the steel bomb of Example I at 20,000 p.s.i. and 150° C. in the presence of approximately 8% methane and oxygen as a catalyst. In successive runs about 4% by weight of cyclohexane and cyclopentane respectively, are used as chemical modifiers. The rate of polymerization is comparable to that obtained in Example III, as compared to that in Example II, and Example IV.

*Example VII*

Ethylene is polymerized in the steel bomb of Example I at 20,000 p.s.i. and 130° C. in the presence of approximately 8% methane and di-tertiary butyl peroxide as a catalyst. In successive runs about 4% by weight of methylene chloride, chloroform, and carbon tetrachloride respectively, are used as chemical modifiers. The rate of polymerization is comparable to that obtained in Example III, as compared to that in Example II, and Example IV.

*Example VIII*

Ethylene is polymerized in the steel bomb of Example I at 20,000 p.s.i. and 130° C. in the presence of approximately 8% methane and di-tertiary butyl peroxide as a catalyst. In successive runs about 4% by weight of methanol, ethanol, and isopropanol respectively, are used as chemical modifiers. The rate of polymerization is comparable to that obtained in Example III, as compared to that in Example II, and Example IV.

*Example IX*

Ethylene is polymerized in the steel bomb of Example I at 20,000 p.s.i. and 130° C. in the presence of approximately 8% methane and di-tertiary butyl peroxide as a catalyst. In successive runs about 4% by weight of methyl ethyl ketone and cyclohexanone respectively, are used as chemical modifiers. The rate of polymerization is comparable to that obtained in Example III, as compared to that in Example II, and Example IV.

*Example X*

Ethylene is polymerized in the steel bomb of Example I at 20,000 p.s.i. and 130° C. in the presence of approximately 8% methane and di-tertiary butyl peroxide as a catalyst. In successive runs about 4% by weight of tetrahydrofuran, dioxane, and dibutylether respectively, are used as chemical modifiers. The rate of polymerization is comparable to that obtained in Example III, as compared to that in Example II, and Example IV.

*Example XI*

Ethylene is polymerized in the steel bomb of Example I at 20,000 p.s.i. and 130° C. in the presence of approximately 8% methane and di-tertiary butyl peroxide as a catalyst. In a test run about 4% by weight of ethylacetate is used as a chemical modifier. The rate of polymerization is comparable to that obtained in Example III, as compared to that in Example II, and Example IV.

*Example XII*

Ethylene is polymerized in the steel bomb of Example I at 20,000 p.s.i. and 200° C. in the presence of approximately 8% methane and tetramethyl azoethane as a catalyst. In a test run about 4% by weight of hydrogen is used as a chemical modifier. The rate of polymerization is comparable to that obtained in Example III, as compared to that in Example II, and Example IV.

It is obvious from the examples above that the addition of methane to the ethylene to be polymerized restores the rate of polymerization when large quantities of a chemical modifier, acetone etc., are used to control molecular weight, especially when lower reaction temperatures are present as in these examples.

Still another effect as a result of adding methane, is the broad molecular weight distribution possible at higher pressures where increased density and increased production rate are possible. Methane acts as a physical modifier at those conditions to bring about the same degree of heterogeneity that exists at lower pressures in a methane-free medium by lowering the critical point of the ethylene which raises the critical solution pressure. Methane can accomplish this because it has the lowest critical point of any hydrocarbon.

The quantity of methane which may be used to accomplish the results of this invention is in the range from about 0.5% to 20% by weight based on the total weight of the ethylene present. In the practice of this invention, the preferred quantity of methane to be added to the ethylene is in the range from about 1% to about 10% by weight of the ethylene.

The catalysts which may be used in the present process comprise those free radical initiators which catalyze the polymerization of ethylene. These substances include oxygen; organic peroxides, such as peracetic acid, diacetyl peroxide, benzoyl peroxide, tertiary butyl perbenzoate, di-tertiary butyl peroxide, and tertiary butyl hydroperoxide; azo compounds and oximes.

This process may be carried out in either a batch or continuous type operation. The batch operation is conducted in the same manner as is described in Example I herein. The preferred method, however, is of the continuous type wherein the ethylene, methane, chemical modifier, and catalyst are charged to a reactor maintained under suitable conditions of temperature and pressure. The polymer in this operation is separated from the reactor effluent continuously and the unreacted ethylene, methane, and chemical modifier are recycled to the reaction zone.

The pressure at which the process of this invention can be successfully conducted is in the range from about 5,000 p.s.i. to about 50,000 p.s.i. although the preferred range is from about 15,000 p.s.i. to about 40,000 p.s.i. The temperature required in the practice of this invention may likewise be varied over a wide range from about 100° C. to about 400° C. with the range from about 150° C. to about 300° C. being preferred.

Chemical modifiers from the groups of aliphatic hydrocarbons having at least 3 carbon atoms, alkyl aromatic hydrocarbons having alpha hydrogen atoms, cyclic hydrocarbons, halogen substituted hydrocarbons, alcohols, ketones, ethers, and esters, other than the ones exemplified by the examples, may be utilized in the practice of this invention.

What is claimed is:

1. A process for the polymerization of ethylene at a temperature in the range from about 100° C. to about 400° C. and the pressure in the range from about 15,000 p.s.i. to about 40,000 p.s.i. in the presence of a free radical initiator, a chemical modifier chosen from the group consisting of aliphatic hydrocarbons, alkyl aromatic hydrocarbons, cyclic hydrocarbons, halogen-substituted hydrocarbons, alcohols, ketones, ethers, esters and hydrogen, and methane as a physical modifier.

2. The process as described in claim 1 wherein the methane is present in an amount from about 0.5% to 20% by weight of the ethylene present.

3. The process as described in claim 2 wherein the chemical modifier is an aliphatic hydrocarbon chosen from the group consisting of propane, propylene, heptane, octadecene, and butene-1.

4. The process as described in claim 2 wherein the chemical modifier is an alkyl aromatic hydrocarbon chosen from the group consisting of xylene, cumene, and toluene.

5. The process as described in claim 2 wherein the chemical modifier is a cyclic hydrocarbon chosen from the group consisting of cyclohexane and cyclopentane.

6. The process as described in claim 2 wherein the chemical modifier is a halogen substituted hydrocarbon chosen from the group consisting of methylene chloride, chloroform, and carbon tetrachloride.

7. The process as described in claim 2 wherein the chemical modifier is an alcohol chosen from the group consisting of methanol, ethanol, and isopropanol.

8. The process as described in claim 2 wherein the chemical modifier is a ketone chosen from the group consisting of methyl ethyl ketone, cyclohexanone, and acetone.

9. The process as described in claim 2 wherein the chemical modifier is an ether chosen from the group consisting of tetrahydrofuran, dioxane, and dibutylether.

10. The process as described in claim 2 wherein the chemical modifier is ethyl acetate.

11. The process as described in claim 2 wherein the chemical modifier is hydrogen.

12. The process as described in claim 2 wherein the chemical modifier is acetone.

References Cited in the file of this patent

UNITED STATES PATENTS 2,482,877     Schmerling  ------------ Sept. 27, 1949

OTHER REFERENCES

Raff et al.: Polyethylene, vol. XI, pages 109–112, 1956.